Feb. 3, 1959 J. D. WASER 2,872,229
SEAL ARRANGEMENT
Filed Nov. 21, 1955 2 Sheets-Sheet 1
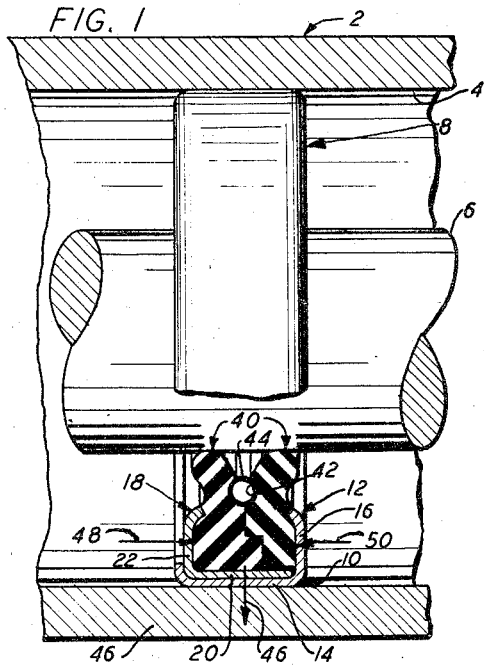
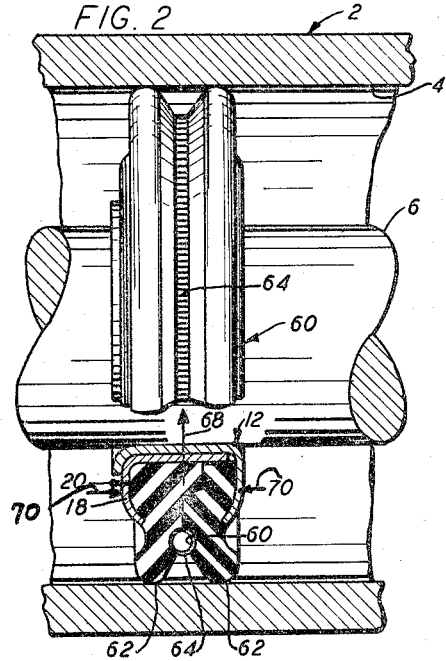
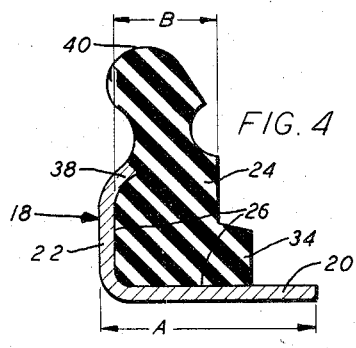
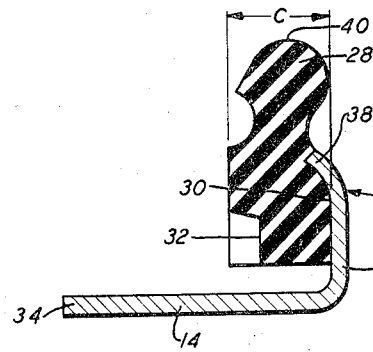
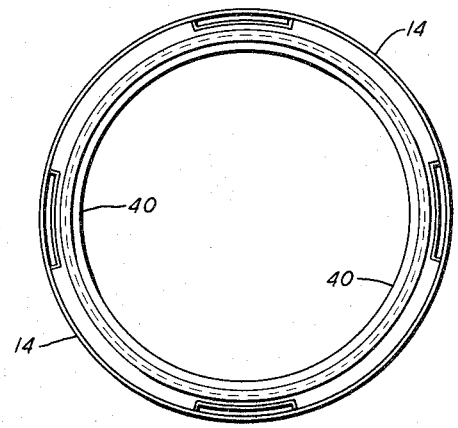
INVENTOR.
JAMES D. WASER

INVENTOR.
JAMES D. WASER

United States Patent Office 2,872,229
Patented Feb. 3, 1959

2,872,229

SEAL ARRANGEMENT

James D. Waser, Joliet, Ill., assignor, by mesne assignments, to Phoenix Manufacturing Company, Joliet, Ill., a corporation of Delaware Application November 21, 1955, Serial No. 548,191

5 Claims. (Cl. 288—3)

The invention relates to a sealing arrangement and is particularly directed to an improved annular seal, which acts as a lubricant retainer and a shield foreign matter entering a protected bearing.

This application is a continuation-in-part of another application of mine, Serial Number 502,453, filed April 19, 1955 and now abandoned.

It is a primary object of the invention to provide an improved seal arrangement which will produce optimum sealing efficiency with a minimum of frictional resistance between relatively rotatable parts.

It is a further object of the invention to provide a seal arrangement that will accommodate comparatively large eccentricities and misalignment between relatively rotatable parts such as a housing and shaft telescoped therein.

It is a further important object of the invention to provide a sealing arrangement of the type described, having a structural formation conducive to longer and more efficient use than those heretofore provided in the art.

It is still a further object of the invention to provide a sealing arrangement of the type described which materially reduces problems of assembly of the seal between a shaft and surrounding housing structure.

The invention particularly comprehends a novel seal design, utilizing a plurality of oppositely directed sealing elements or lips integrally formed with a resilient body, said body being secured to and in pressured confinement between upstanding walls of a channel-like seal housing and having a flexible element disposed therein to pressure engage the body.

Figure 6:
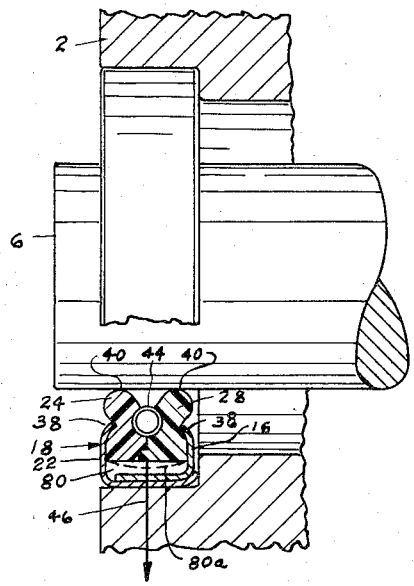
Figure 7:
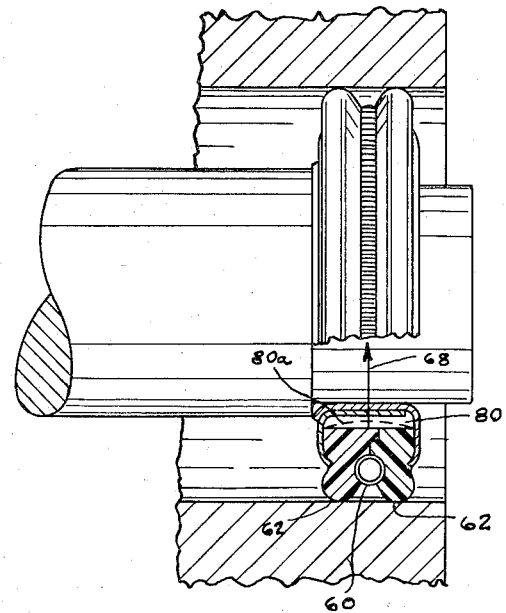

These and other objects of the invention will become apparent in the course of the following description and from an examination of the concerned drawings, wherein:

Figure 1 is a fragmentary view, partially in section, illustrating one embodiment of the invention, Figure 2 is a view similar to Figure 1, illustrating an alternate embodiment of the invention, Figure 3 is a side-elevational view of the embodiment of Figure 1, Figures 4 and 5 are detail fragmentary views, taken in cross section, and illustrating the disassembled sealing arrangement, and Figures 6 and 7 illustrate still other and improved alternate embodiments of the invention.

Describing the invention in detail and directing attention first to Figure 1 it will be seen that a housing, indicated generally at 2, is provided with an internal bore 4, said bore receiving in telescoped relation therewith a shaft 6. This construction is typical of many machine elements wherein a shaft and associated housing are arranged in relative rotatable relation to each other.

To provide and accommodate such relative rotation the machine elements usually have a bearing (not shown) which movably interconnects the housing and shaft 6. The bearings are delicately machined, finely surfaced mechanisms, which require continuous lubrication and freedom from foreign matter. The lubrication is, of course, provided by grease, oil or other suitable lubricant and means must be provided to prevent the egress of such lubricant during relative motion between the parts. In addition, this means serves as a seal to prevent the entrance of foreign matter to the bearing itself.

The invention herein disclosed is directed to a novel seal arrangement, such as illustrated generally at 8 in Figure 1. The seal is preferably provided with a seal housing, or circular mounting member indicated generally at 10. In the preferred embodiment, the mounting member 10 consists of an angular section 12 having a base wall 14 and upstanding therefrom on one side thereof, a vertical wall 16. Another angular section 18 is provided having a base wall 20 and upstanding from one edge thereof a vertical wall 22. The particular construction of the several channels employed is illustrated in detail in Figures 4 and 5.

Each channel is provided with a portion of the seal element, said portion being bonded to the associated section along the areas of engagement therebetween. Considering Figure 4, it will be seen that the section 18 is provided with a portion of seal 24, said seal being bonded to the section along the inner surfaces 26. Directing attention to Figure 5, it will be seen that the section 12 is provided with a seal portion 28, which is bonded to the section along the surface 30. The lower plate 14 is in spaced relation to the portion 28 to provide for the assembly of the section 18. In addition, the seal portion 28 is provided with a plurality of indentures 32, which complementally engage the bosses 34 of the seal portion 24 thereby preventing relative rotation between the portions 24 and 28 after seal assembly and during relative rotative movement between the shaft 6 and housing 2. It will be understood that seal construction as herein illustrated has the desirable result of comparatively inexpensive manufacture. Further, the interlocking of the bosses 34 with indentures 32 prevents, as noted, relative movement between the seal portions 24 and 28, which movement would tend to destroy the effectiveness and the life of the seal.

In the assembled form of the preferred embodiment the section 18 is partially received within the section 12 and the outer extremity 34 of the plate 14 is arcuately bent upwardly around the section 18 to fixedly lock the section in place. It will be noted that the lower plate 20 of the section 18 engages the vertical wall 16 of the section 12 to positively determine the degree of association between the sections 12 and 18 in the assembled state of the seal. It will also be understood that the length A of the plate 14 is less than the sum of the lengths B and C of the seal portions 24 and 28 whereby, during the assembly operation, the walls 22 and 16 pressure confine seal portions 24 and 28.

In the preferred embodiment the seal portions are made of a flexible or resilient material, preferably rubber, which will not compress across its mass. It will be additionally noted that the upper portions of the walls 22 and 16 are arced inwardly, as at 38, to further confine the seal portions in assembled position. The purpose of this confining and pressure assembly of the seal portions will hereinafter be described in detail.

Returning to Figure 1 it will be seen that the assembled seal comprises a plurality of laterally spaced lips or sealing elements 40, which are integrally formed with the confined seal portions. The lips 40 define therebetween an aperture 42, which is continuously disposed around the seal. It will also be noted that the lips 40 are preferably of arcuate form when seen in cross section, as it has been found that this arcuate formation is better adapted to utilize to best advantage the induced stresses hereinafter explained to afford an optimum operating seal.

A spring or spring element 44 is peripherally disposed in the aperture 42, and, in the embodiment of Figure 1, said spring 44 is compressively loaded when so placed. This compressive loading can be accomplished in several ways, among them being providing a continuous spring having an outer diameter greater than the outer diameter of the receiving cavity 42. Thus it will be understood that the spring 44 in the embodiment of Figure 1 exerts a radially outward pressure, as illustrated by the force arrow 46, across the main body of the seal.

Considering now the mentioned fact that the main body of the seal is compressively loaded on assembly of the several angular members, thereby exerting a pressure on the confined resilient material as illustrated by the force arrows 48 and 50. The combined action of forces 46, 48 and 50 produces a physical tensioning effect in a transverse direction along the arcuate surfaces of the lips 40. It has been discovered that the induction of this physical tension in the surfaces of the lips 40 produces a seal having considerably longer operating life than those heretofore provided in the art. It has also been found that the arcuate bends 38, 38 in the upper portions of the walls 16 and 22 can best contribute to this controlled surface tensioning effect by being formed to lines that approximately intersect the spring 44. It will be readily understood that in order to produce a desired tensioning effect which extends transversely through the outer surface of the lips 40, the force applied by the spring 44 must be resisted by another force applied to the surface of the lips 40 in spaced relation to the point of application of the force of the spring 44. I achieve this novel transverse tensioning effect by means of securely bonding the rubber segments 24 and 28 to the upstanding walls 16 and 22, respectively, and by additionally providing the inwardly directed bent portions 38, 38 as is shown in Figures 4 and 5 and by the compressive action during assembly as above described and as illustrated by force arrows 48 and 50. It will be understood that the compressive action of the walls 16 and 18 and the bent portions 38, 38, tends to urge the lips 40 to bend outwardly away from each other. The action of the spring 44, on the other hand, tends to urge the lips 40 to bend inwardly. It is thought obvious that the combined action of these forces results in a pronounced surface tensioning effect in the lips 40 and extending directionally between the portion 38 and the spring 44, that is, transversely of the lips. I have found that this tensioning effect provides a seal having considerably longer operating life than those heretofore used in the art and additionally offers improved seal operation especially where there is pronounced eccentric movement between the stationary and rotatable parts with which the seal is associated.

It has also been found that it is considerably easier to assemble the disclosed seal to a shaft or housing. As will be understood by those skilled in the art, the seal is press fitted within the aperture 4 of the housing 2. The shaft must then be telescoped within the lips 40 in such a manner as to tightly engage therewith. In prior art embodiments it was found that one or the other of the lips, depending on the direction of assembly, would fold over during the assembly process thereby reducing the effectiveness of the seal and, in some instances, where the fold was not continuous around the entire inner periphery of the lip, the partial fold under the rotative action of the shaft would act as a pump to actually force the confined lubricant out of the seal. The disclosed structure greatly improves this condition in that it is virtually impossible to fold over one of the lips during the assembly operation. It will also be understood that the arcuate formation of the lips 40 aids in preventing fold over.

Directing attention to Figure 2, an alternate application of the invention, it will be seen that the seal 60 is press fitted, or otherwise fixedly secured, to the shaft 6 and again comprises assembled seal confining sections 12 and 18. In most particulars the construction of the seal 60 is identical with that of the seal 8, illustrated in Figure 1. It will be noted, however, that the lips 62 are directed radially outwardly to engage the inner periphery of the aperture 4 provided by the housing 2. The spring 64 is provided and is arranged to be disposed within an aperture 66 defined intermediate the lips 62. In this arrangement the spring 64 is assembled under tension whereby the spring exerts a radially inwardly force against the body of the seal as indicated by the force arrow 68. Again, as in the previous embodiment, assembly of the seal provides compressive forces illustrated by the force arrows 70 on the main body of the seal. With this structure the same physical tension in the surface of the lips that was found in the previous embodiment is produced, and the same beneficial results flow therefrom.

Directing attention to Figures 6 and 7, there is illustrated an improved embodiment of the invention wherein parts identical with the embodiments heretofore described have been labeled with identical numerals. Considering Figure 6, it will be seen that an aperture or opening 80 is provided to extend from the wall 16 to the wall 22 immediately below and coextensive with the rubber portions 24, 28. It will be appreciated that the force action of the spring 44 as shown by the arrow 46 causes the rubber segments 24 and 28 to bulge outwardly into the cavity 80 as shown in dotted lines at 80a. The effect of providing this cavity 80 is to augment the tensioning effect produced in the lips 40 and described above. This is thought obvious in view of the fact that rubber and other rubber-like material in seals of this nature are largely incompressible throughout their mass. The provision of the relief or cavity 80 allows the rubber mass to breathe and bend in response to the applied force 46 while the opposite edge of the surface of the lips 40 are still held fixedly in place at 38, 38. Thus, the provision for the cavity 80 materially increases the transverse surface tensioning effect which extends through the surface of the lips 40. The embodiment of Figure 7 in both function and effect is identical and relative to that of Figure 6 except it is shown as applied to a seal arrangement wherein the lips are directed outwardly.

It will be noted that only a pair of lips are provided in each of the embodiments illustrated but it will be understood that seals may be provided utilizing the disclosed invention wherein a plurality of lips in excess of two may be provided. Such structures are of special application only and are believed to be within the purview of one skilled in the art upon disclosure of the herein set out invention. These modifications, of course, would incorporate the force application and resulting surface tension embodied in the disclosed forms.

Thus it will be seen that I have provided a novel sealing arrangement having new and useful characteristics which afford a longer service life than the seals heretofore utilized in the art. Additionally, the sealing arrangement solves an assembly problem long existent in this field and provides for positive assured sealing under virtually all assembly conditions.

It will be understood that the invention herein disclosed is susceptible of various modifications and alternate embodiments without departing from the spirit thereof or the scope of the appended claims.

I claim:

1. In a seal arrangement, a channel shaped confining shell comprising a base with spaced substantially parallel walls upstanding on opposite edges thereof, a sealing element formed of elastic material interposed between said upstanding walls and in spaced relation to the base, said walls being arranged to exert compressive forces on said sealing element, a groove formed in said element approximately centrally thereof dividing said element into lips extended away from said walls, a spring disposed in said groove and exerting a pressure on said element in a direction opposite to the extended direction of said lips, said walls being fixedly bonded to said element at opposite sides of the lips, said forces and said pressure being arranged to induce a tension in the surface of said lips transversely thereof between the spring and the walls.

2. A seal arranged according to claim 1, and including bent portions on adjacent extremities of said walls, said bent portions being directed inwardly toward and compressively engaging the element to increase the surface tensioning effect in said lips.

3. In a seal arrangement, a metal base member comprising an L-shaped section having an elastic element bonded thereto, another L-shaped section having another elastic element bonded thereto, said sections being interlocked to bring the respective elements into pressured engagement with each other, bosses on one element received in registering apertures in the other element to prevent relative rotation between the elements, arcuately surfaced sealing lips on the respective elements extending away from the sections defining a groove therebetween, and an elastic member in the groove exerting a pressure on the elements in a direction opposite to the direction of the extension of the lips, said pressured engagement between the elements and the pressure of said elastic member combining to induce a transverse tension in the surface of the lips.

4. A seal arrangement according to claim 3, wherein portions of the sections are spaced from their respective elements to define a cavity therebetween.

5. In a seal arrangement, a channel-shaped confining shell having a base wall and spaced generally parallel side walls, a resilient member interposed between and secured to the side walls and spaced from the base wall whereby a cavity is defined between the resilient member and the base wall, said side walls being arranged to exert compressive forces on said resilient member, said resilient member having spaced parallel lips extending away from the walls and defining elongated groove therebetween, an elastic element disposed in said groove and in pressured engagement with said resilient member and arranged to exert a force thereon in a direction opposed to the direction of extension of said lips, said compressive forces and said last mentioned force producing a tension effect in the surface of said lips.

References Cited in the file of this patent

UNITED STATES PATENTS

| | | |
|---|---|---|
| 1,938,648 | Victor et al. | Dec. 12, 1933 |
| 2,173,247 | Bott | Sept. 19, 1939 |
| 2,210,823 | Victor et al. | Aug. 6, 1940 |
| 2,233,359 | Rogers | Feb. 25, 1941 |
| 2,274,234 | Ekkebus et al. | Feb. 24, 1942 |

FOREIGN PATENTS

| | | |
|---|---|---|
| 901,976 | Germany | Jan. 18, 1954 |